(12) United States Patent
Kim et al.

(10) Patent No.: US 9,386,337 B2
(45) Date of Patent: *Jul. 5, 2016

(54) METHOD FOR EXECUTING USER COMMAND ACCORDING TO SPATIAL MOVEMENT OF USER INPUT DEVICE AND IMAGE APPARATUS THEREOF

(71) Applicant: SAMSUNG ELECTRONICS CO., LTD., Suwon-si (KR)

(72) Inventors: Joon-hwan Kim, Yongin-si (KR); Seong-ick Jon, Seoul (KR); Young-hwa Yun, Seoul (KR); Jeong-yeon Lee, Seongnam-si (KR); Woo-seok Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,534

(22) Filed: Aug. 7, 2015

(65) Prior Publication Data
US 2015/0350713 A1 Dec. 3, 2015

Related U.S. Application Data

(60) Continuation of application No. 14/338,514, filed on Jul. 23, 2014, now Pat. No. 9,131,259, which is a continuation of application No. 13/965,828, filed on Aug. 13, 2013, now Pat. No. 8,826,186, which is a (Continued)

(30) Foreign Application Priority Data

Apr. 2, 2007 (KR) .................. 10-2007-0032476

(51) Int. Cl.
*G06F 3/0346* (2013.01)
*H04N 21/422* (2011.01)

(Continued)

(52) U.S. Cl.
CPC ........ *H04N 21/42206* (2013.01); *G06F 3/0346* (2013.01); *G06F 3/0482* (2013.01);
(Continued)

(58) Field of Classification Search
CPC ... G06F 3/016; G06F 3/03543; G06F 1/1626; G06F 3/0481; G06F 9/4443; G06F 3/0482; G06F 3/04812; G06F 3/04883; G06F 3/046; G06F 3/038; H04N 5/44543; G11B 27/34
See application file for complete search history.

(56) References Cited

U.S. PATENT DOCUMENTS 5,655,093 A * 8/1997 Frid-Nielsen ....... G06F 3/04812
345/169
6,903,723 B1 6/2005 Forest
(Continued)

FOREIGN PATENT DOCUMENTS

GB  2 410 662 A  8/2005

OTHER PUBLICATIONS

Office Action issued in Korean Patent Application No. 10-2007-0032476 on Jul. 24, 2013.

*Primary Examiner* — Xiomar L Bautista
(74) *Attorney, Agent, or Firm* — Sughrue Mion, PLLC

(57) ABSTRACT

A broadcasting signal processing apparatus for controlling display of an image based on a received broadcasting signal, in response to a user selection command being continuously received while displaying the image, controlling display of a plurality of visual guide items on the image, the plurality of visual guide items representing a plurality of functions of the broadcasting signal processing apparatus for guiding a user how to control the input device to select a function among the plurality of functions, determining a movement direction of a pointing position while the user selection command is continuously received based on first and second information, and in response to the user selection command not being received, executing a function among the plurality of functions based on the movement direction of the pointing position.

5 Claims, 11 Drawing Sheets

Related U.S. Application Data continuation of application No. 13/189,134, filed on Jul. 22, 2011, now Pat. No. 8,819,595, which is a division of application No. 11/937,520, filed on Nov. 9, 2007, now Pat. No. 8,015,508.

(51) Int. Cl.
*G06F 3/0482* (2013.01)
*G06F 3/0484* (2013.01)
*H04N 5/44* (2011.01)
*H04N 21/482* (2011.01)
*H04N 21/485* (2011.01)

(52) U.S. Cl.
CPC .......... *G06F3/04847* (2013.01); *H04N 5/4403* (2013.01); *H04N 21/4221* (2013.01); *H04N 21/482* (2013.01); *H04N 21/4852* (2013.01); *H04N 21/4854* (2013.01); *H04N 21/42222* (2013.01); *H04N 2005/4432* (2013.01)

(56) References Cited

U.S. PATENT DOCUMENTS

| | | |
|---|---|---|
| 7,102,616 B1 | 9/2006 | Sleator |
| 7,137,075 B2 | 11/2006 | Hoshino et al. |
| 7,173,604 B2 * | 2/2007 | Marvit .................. G06F 3/017 345/156 |
| 7,598,942 B2 | 10/2009 | Underkoffler et al. |
| 7,721,231 B2 * | 5/2010 | Wilson .................. G06F 3/0346 345/156 |
| 7,818,691 B2 | 10/2010 | Irvine |
| 2004/0218104 A1 | 11/2004 | Smith et al. |
| 2004/0222971 A1 | 11/2004 | Mo |
| 2004/0252102 A1 | 12/2004 | Wilson et al. |
| 2007/0174869 A1 | 7/2007 | Kim |
| 2007/0261001 A1 | 11/2007 | Nagiyama et al. |
| 2008/0001920 A1 | 1/2008 | Namiki |
| 2008/0229254 A1 | 9/2008 | Warner |

* cited by examiner

METHOD FOR EXECUTING USER COMMAND ACCORDING TO SPATIAL MOVEMENT OF USER INPUT DEVICE AND IMAGE APPARATUS THEREOF

CROSS-REFERENCE TO RELATED APPLICATIONS

This is a continuation application of U.S. patent application Ser. No. 14/338,514, filed on Jul. 23, 2014, in the U.S. Patent and Trademark Office, which is a continuation application of U.S. patent application Ser. No. 13/965,828, filed on Aug. 13, 2013, in the U.S. Patent and Trademark Office, now U.S. Pat. No. 8,826,186, which is a continuation application of U.S. patent application Ser. No. 13/189,134, filed on Jul. 22, 2011, in the U.S. Patent and Trademark Office, now U.S. Pat. No. 8,819,595, which is a divisional application of U.S. patent application Ser. No. 11/937,520, filed on Nov. 9, 2007, in the U.S. Patent and Trademark Office, now U.S. Pat. No. 8,015,508, which claims priority from Korean Patent Application No. 10-2007-0032476, filed on Apr. 2, 2007, in the Korean Intellectual Property Office, the contents of which are incorporated herein by reference in their entireties.

BACKGROUND OF THE INVENTION

1. Field of the Invention

Apparatuses and methods consistent with the present invention relate to executing a user command, and more particularly, to executing a user command which is inputted through a user input device.

2. Description of the Related Art

An image apparatus such as a television (TV) requires a user to input a command by manipulating a key on the remote control device, which inconveniences the user.

An image apparatus provides many functions, and the number of functions continuously increases. The number of keys on the remote control also increases to keep up with the multi-functionization of an electronic device, as an additional key is required for each new function.

The size of the remote control is also increased as the number of keys increases. Considering users' preference for a more compact remote control, a method for inputting a desired command without manipulating a key is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for executing a user command based on a spatial movement of a user input device and an image apparatus using the same, according to which a user command is inputted without requiring a key manipulation.

According to an aspect of the present invention, there is provided a method for executing a user command including determining a direction of movement of a user input device which is movable by a user; selecting one of a plurality of functions based on the determined direction of movement; and executing the selected function.

The determining may determine the direction and distance of movement of the user input device, and the selecting may be based on the determined direction of movement if the distance of movement of the user input device exceeds a predetermined distance; while a function is not selected if the distance of movement of the user input device is within the predetermined distance.

The selecting may be based on the determined direction of movement if a user moves the user input device while keeping a key on the user input device in a depressed state.

The executing may include reiteratively executing the selected function if the selected function is a reiteratively operable function and the user keeps the key in the depressed state; and interrupting operation of the selected function if the user releases the key from the depressed state.

The executing may include reiteratively executing the selected function if the selected function is a reiteratively operable function and the user keeps the selected function in a selected state; and interrupting operation of the selected function if the selected function is released from the selected state by moving the user input device.

The selecting may select one of the plurality of functions based on the determined direction of movement if a user moves the user input device while keeping a key on the user input device in a depressed state, and the selecting may execute the selected function if the user releases the key from the depressed state.

The determining may determine the direction and distance of movement of the user input device, and the selecting may select one of the plurality of functions based on the determined direction and the determined distance of movement of the user input device.

The method may further include displaying items which visually represent the plurality of functions on respective areas of a display.

The selected function may include one of a broadcast channel change function, a volume change function, an input source selection function, a mode selection function, a screen brightness adjust function, and an item selection function.

The selecting may include selecting a function which increases a broadcast channel number, if the user input device is moved in an upwards direction; selecting a function which reduces the broadcast channel number, if the user input device is moved in a downwards direction; selecting a function which reduces a volume, if the user input device is moved in a leftwards direction; and selecting a function which increases the volume, if the user input device is moved in a rightwards direction.

The user input device may include a remote control device, and a face of the remote control device may be movable by the user.

According to another aspect of the present invention, there is provided an image apparatus including a receiver which receives information about a direction of movement of a user input device from the user input device; and a controller which determines the direction of movement of the user input device based on information received from the receiver, selects one of a plurality of functions based on the determined direction of movement, and executes the selected function.

The controller may determine the direction and a distance of movement of the user input device based on the information received from the receiver, and if the determined distance of movement of the user input device exceeds a distance, the controller selects one of the plurality of functions based on the determined direction of the movement, while the controller does not execute any function if the determined distance of movement of the user input device is within the distance.

If the user moves the user input device while keeping a key in a depressed state, the controller may select one of the plurality of functions based on the determined direction of movement.

If the selected function is a reiteratively operable function, and the user keeps the key in the depressed state, the controller may cause the selected function to be reiteratively operated, and if the user releases the key from the depressed state, the controller may cause the operation of the selected function to be interrupted.

If the selected function is a reiteratively operable function, and the selected function is manipulated in the selected state, the controller may cause the selected function to be reiteratively operated, and if the selected function is released from the selected state by moving the user input device, the controller may cause the operation of the selected function to be interrupted.

If the user moves the user input device while keeping a key in a depressed state, the controller may select one of the plurality of functions based on the determined direction of movement, and if the user releases the key from the depressed state, the controller may cause the operation of the selected function to be interrupted.

The controller may also determine a distance of movement of the user input device based on the information received from the receiver, and select one of the plurality of functions based on the determined direction and the determined distance of the movement of the user input device.

The image apparatus may also include a generator which generates visual information to be displayed on a display, wherein the controller controls the generator such that items which visually represent the plurality of functions are displayed in different areas of the display.

The function may include a broadcast channel change function, a volume change function, an input source selection function, a mode selection function, a screen brightness adjust function, or an item selection function.

If the user input device is moved in an upwards direction, the controller may select a function which increases a broadcast channel number; if the user input device is moved in a downwards direction, the controller may select a function which reduces the broadcast channel number; if the user input device is moved in a leftwards direction, the controller may select a function which reduces a volume; and if the user input device is moved in a rightwards direction, the controller may select a function which increases the volume.

The user input device may include a remote control device, and a face of the remote control device may be movable by the user.

According to another aspect of the present invention, there is provided a method for executing a user command, including determining a position of a pointer which is moved on a display based on a movement of a user input device; selecting one of a plurality of functions based on the position of the pointer; and executing the selected function.

The pointer may be a virtual pointer which does not exist on the display.

The method may further include displaying items which visually represent the plurality of functions on different areas of the display.

The display may be divided into a plurality of areas, and the selected function may be assigned to an area on which the pointer is positioned.

The display may be divided into a plurality of areas, and no function may be selected if the pointer is positioned on the center of the display; and a function which is assigned to an area on which the pointer is positioned may be selected if the pointer is positioned out of the center of the display.

According to another aspect of the present invention, there is provided an image system including a user input device which is moved by a user; and an image apparatus which determines a position of a pointer which is moved on a display based on a spatial movement of the user input device, selects one of a plurality of functions based on the position of the pointer, and executes the selected function.

The pointer may be a virtual pointer which does not exist on the display.

The image apparatus may display items which visually represent the plurality of functions on the different areas of the display.

The display may be divided into a plurality of areas, and the image apparatus may select a function which is assigned to an area on which the pointer is positioned.

The display may be divided into a plurality of areas, and if the pointer is positioned on the center of the display, the image apparatus does not select any one of a plurality of functions; and if the pointer is positioned out of the center of the display, the image apparatus selects a function which is assigned to an area on which the pointer is positioned.

BRIEF DESCRIPTION OF THE DRAWINGS

These and/or other aspects of the invention will become apparent and more readily appreciated from the following description of exemplary embodiments, taken in conjunction with the accompanying drawing figures of which.

DETAILED DESCRIPTION OF EXEMPLARY EMBODIMENTS OF THE PRESENT INVENTION

Certain exemplary embodiments of the present invention will now be described in greater detail with reference to the accompanying drawings.

Figure 1A:
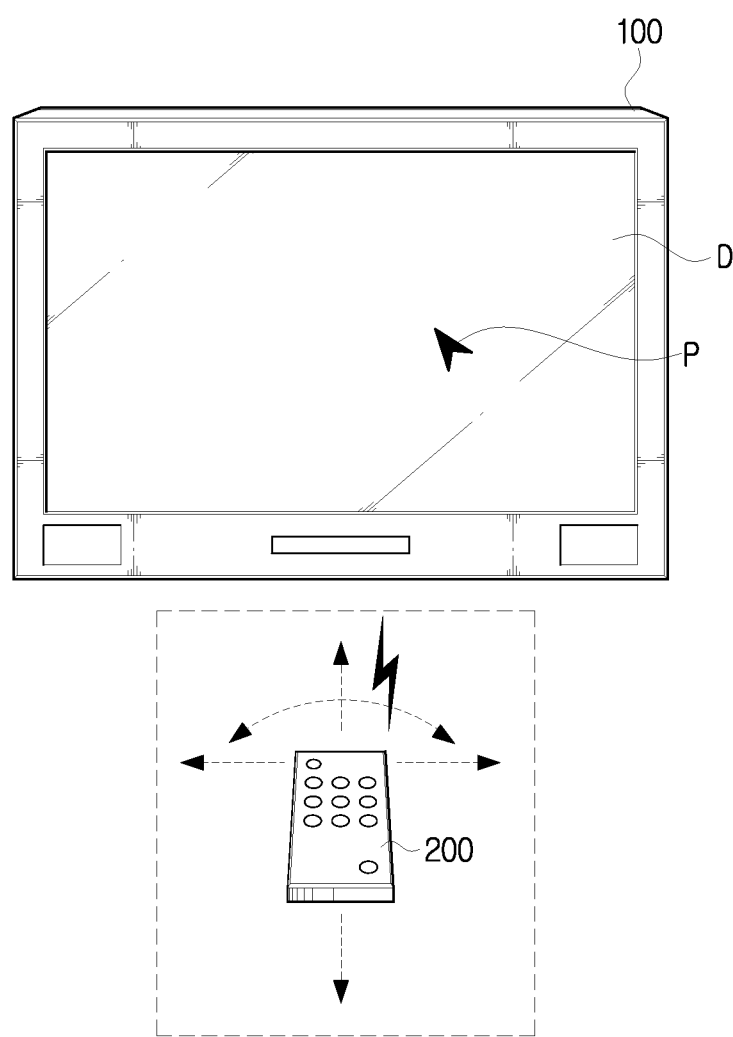
FIGS. 1A to 1C are views illustrating a broadcast receiving system in accordance with an exemplary embodiment of the present invention.

FIG. 1A is a view illustrating a broadcast receiving system according to an exemplary embodiment of the present invention. Referring to FIG. 1A, a broadcast receiving system comprises a DTV 100 as a broadcast receiving apparatus and a remote control 200 as a user input apparatus.

The DTV 100 provides a user with a broadcast received over wire or wirelessly, through a display D. Additionally, the DTV 100 may provide a user with an external input received from an external apparatus which is connected over wire or wirelessly, through the display D, and may also provide a user with a broadcast by reproducing a file, such as a moving image file, a still image file, or a music file, which is stored in a built-in storage medium.

The remote control 200 sends information about the manipulation of the user to the DTV 100, and the DTV 100 operates according to the received information. Although the remote control 200 of FIG. 1A includes a plurality of keys, the remote control 200 may include either one or two keys. A plurality of keys are provided on the top side of the remote control 200, but the plurality of keys may be provided on the other sides, such as the left or right side, or the bottom side.

As indicated by a dotted arrow in FIG. 1A, the face of the remote control 200 may be moved by the user in an upwards or downwards direction, or to the left or right, or in a direction combining two of these directions, such as an upper-leftwards direction. That is, the face of the remote control 200 may be moved in any direction.

Figure 1B:
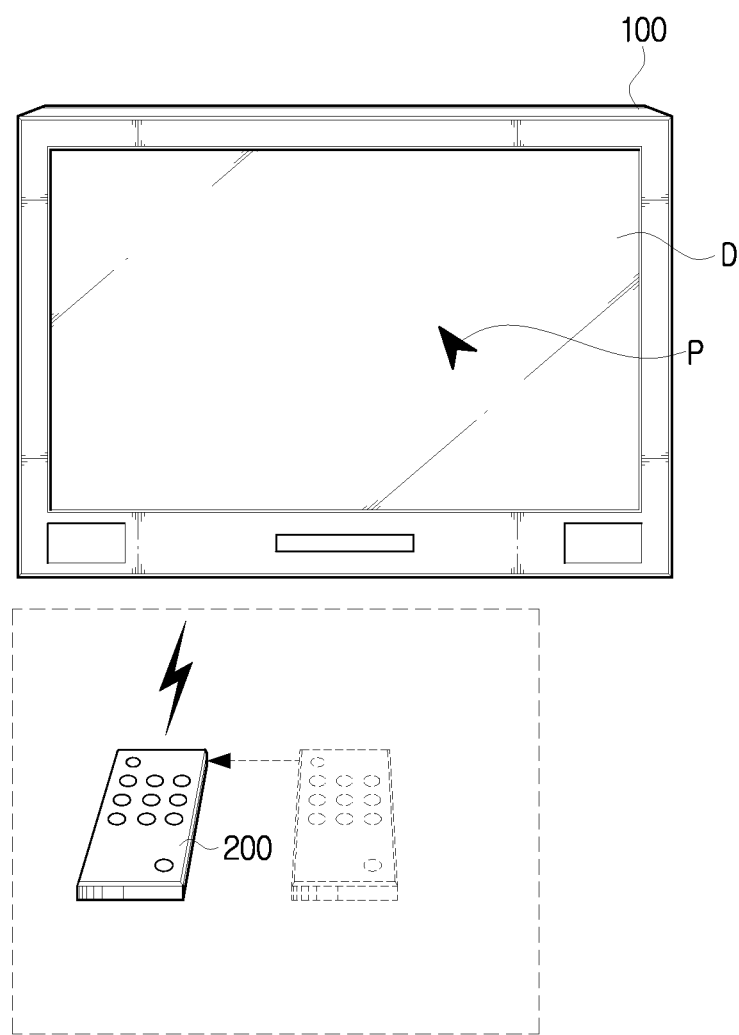

For example, the face of the remote control 200 may be moved while drawing a locus on a virtual plane (VP) which is parallel to a screen of the display D. FIG. 1B is a view illustrating a case in which the face of the remote control 200 is moved to the left direction while drawing locus on a virtual plane which is parallel to the screen of the display D.

The VP may not be completely parallel to the screen of the display D, and may not be a complete plane. That is, it is practically impossible for the movement of the face of the remote control 200 by the user to be on a complete plane and completely parallel to the screen of the display D.

Accordingly, the present invention is applicable to the case in which the face of the remote control 200 moves on an incomplete plane and not completely parallel to the screen of the display D.

A user may move the face of the remote control 200 by turning only the user's wrist while the user's arm holding the remote control 200 is fixed.

Figure 1C:
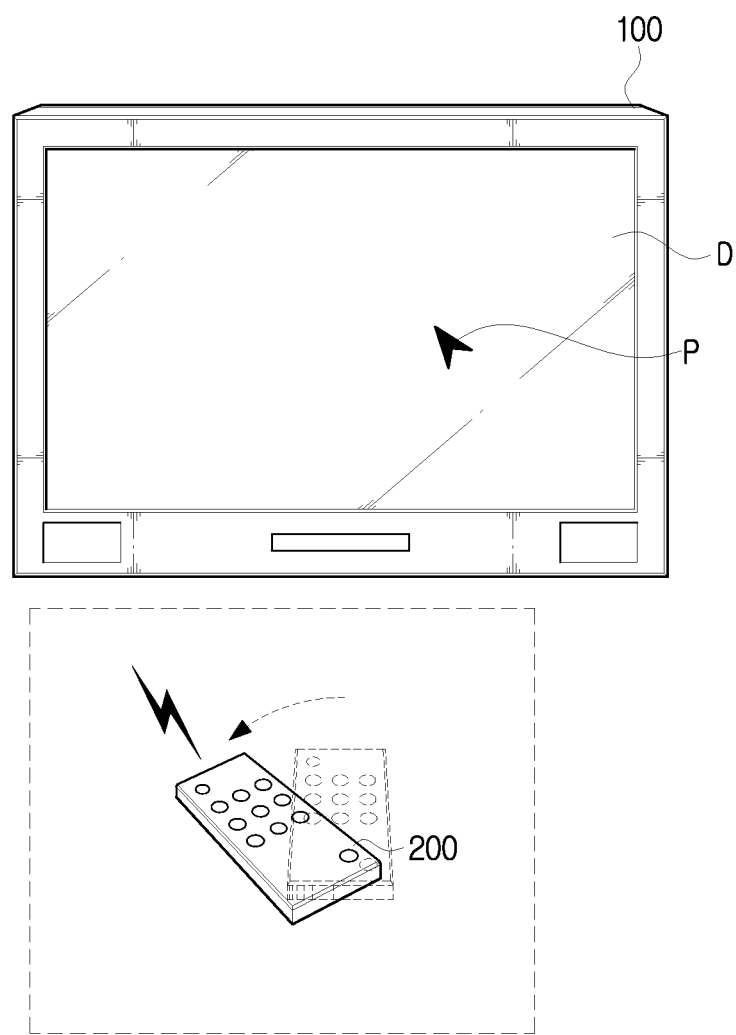

If only the user's wrist moves in an upwards or downwards direction, or to the left or right, or in a direction combining these, such as an upper leftward direction, the face of the remote control 200 may be moved upwards, downwards, or to the left or right, or in a direction combining these, such as an upper leftwards direction, while drawing a curved locus on a virtual hemisphere surface. FIG. 1C is a view illustrating the case in which the face of the remote control 200 is moved to the left by a user while drawing a curved locus on a virtual hemisphere surface.

The virtual hemisphere surface, on which the face of the remote control 200 is moved by rotation of the user's wrist, may be a mathematically incomplete hemisphere surface. That is, it is practically impossible for the face of the remote control 200 to be moved by rotating the user's wrist while drawing a locus on a mathematically complete hemisphere surface.

Accordingly, the present invention may be applicable to the case in which the face of the remote control 200 moves not on a mathematically complete hemisphere, but on an incomplete hemisphere surface, while drawing a curved locus.

That is, the pointer P displayed on the display D may be moved by the user spatially moving the remote control 200. The spatial movement of the face of the remote control 200 is distinguished from the movement of a mouse for a personal computer (PC), which is moved over a surface.

When the face of the remote control 200 is moved, the pointer P displayed on the display D moves in the same direction as the face of the remote control 200. For example, i) if a user moves the face of the remote control 200 upwards, the pointer P may move upwards, and ii) if the user moves the face of the remote control 200 to the upper-left, the pointer P may move to the upper-left.

Figure 2:
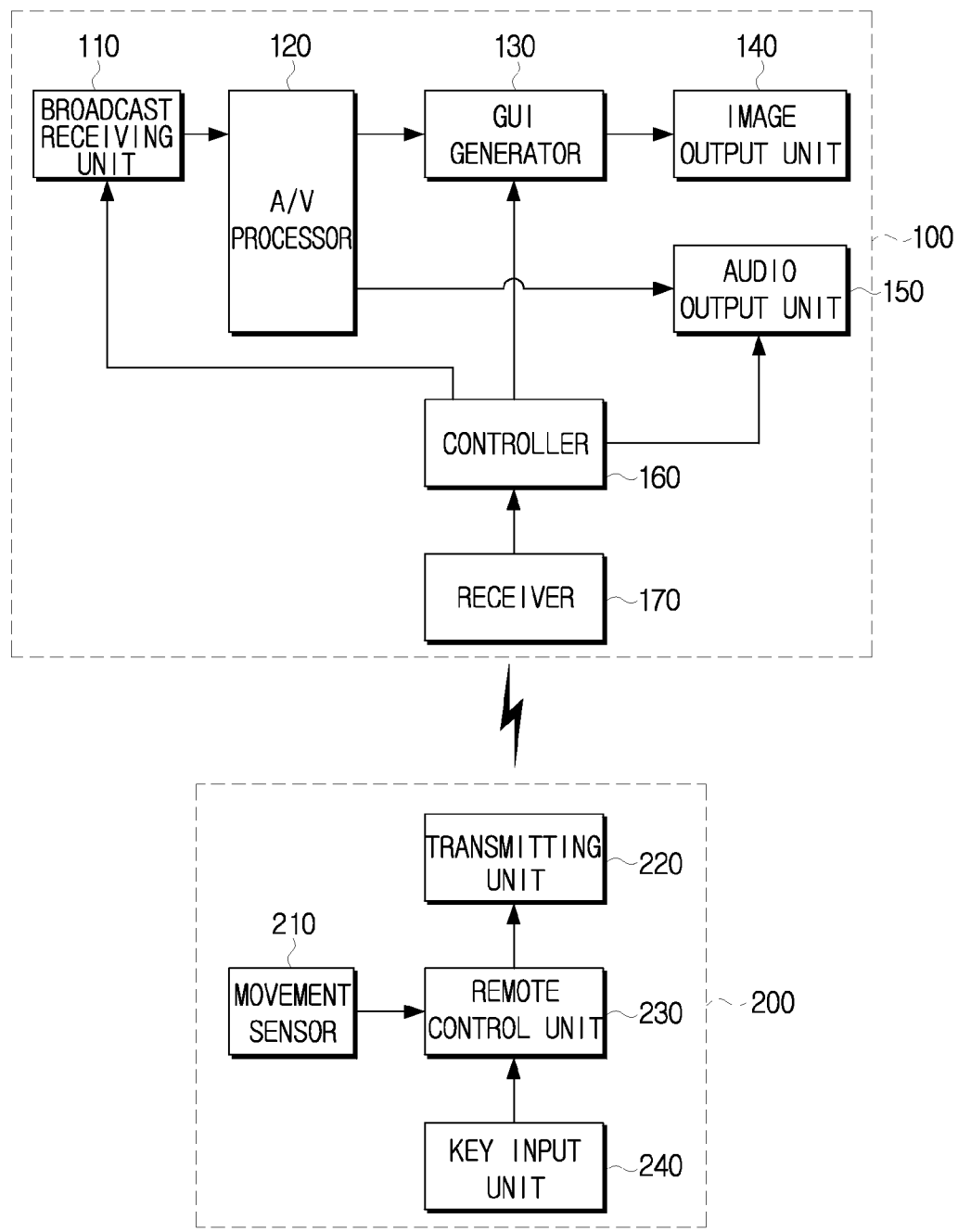
FIG. 2 is a detailed block diagram of a digital television (DTV) and a remote control.

Hereinafter, the DTV 100 and the remote control 200 illustrated in FIG. 1 will be explained in detail with reference to FIG. 2. FIG. 2 is a detailed block diagram of the DTV 100 and the remote control 200.

Referring to FIG. 2, the remote control 200 comprises a movement sensor 210, a transmitting unit 220, a remote control unit 230, and a key input unit 240.

The movement sensor 210 senses the movement of the face of the remote control 200 by user, and sends the result of the sensing to the remote control unit 230, which will be explained in detail below. An exemplary implementation may use a biaxial gyro sensor as the movement sensor 210.

The key input unit 240 may comprise a power key, a channel key, a volume key, and a select key.

The remote control unit 230 transmits information about the movement, such as the moving direction and the moving distance, which is obtained from the sensing result and transmitted from the movement sensor 210 to the TV 100 via the transmitting unit 220. The remote control unit 230 also sends the TV 100 information about keys inputted by the user through the transmitting unit 220.

Referring to FIG. 2, the DTV 100 comprises a broadcast receiving unit 110, an A/V processor 120, a Graphic User Interface (GUI) generator 130, an image output unit 140, an audio output unit 150, a controller 160, and a receiver 170.

The broadcast receiving unit 110 receives a broadcast over wire or wirelessly from a broadcasting station or a satellite, and decodes the received broadcast.

The A/V processor 120 executes signal processing, such as video decoding, video scaling, and audio decoding of the broadcast outputted from the broadcast receiving unit 110. And the A/V processor 120 transmits the image signal to the GUI generator 130, and the audio signal to the audio output unit 150.

The GUI generator 130 generates a GUI to display on the display D, and combines the GUI with the image outputted from the A/V processor 120.

The image output unit 140 may display the image combining the GUI outputted from the GUI generator 130 on the display D, or output to an external display, such as an external DTV connected through an external output terminal (not shown).

The audio output unit 150 outputs the audio outputted from the A/V processor 120 via a speaker, or outputs to the external device connected through the external output terminal.

The controller 160 receives the commands inputted by user manipulation of the face of the remote control 200, or by key input which is transmitted from the remote control 200 via the receiver 170, and controls the overall operation of the DTV 100.

The controller 160 determines the direction of movement of the face of the remote control 200 based on information received through the receiver 170, and selects a function according to the determined direction of movement. Also, the controller controls the operation of the DTV 100 to conduct the selected function.

That is, the controller 160 determines the position of the pointer P, which is moved on the display D according to the spatial movement of the face of the remote control 200, and executes the function selected based on the determined position of the pointer P. The above process is described below with reference to FIG. 3.

Figure 3:
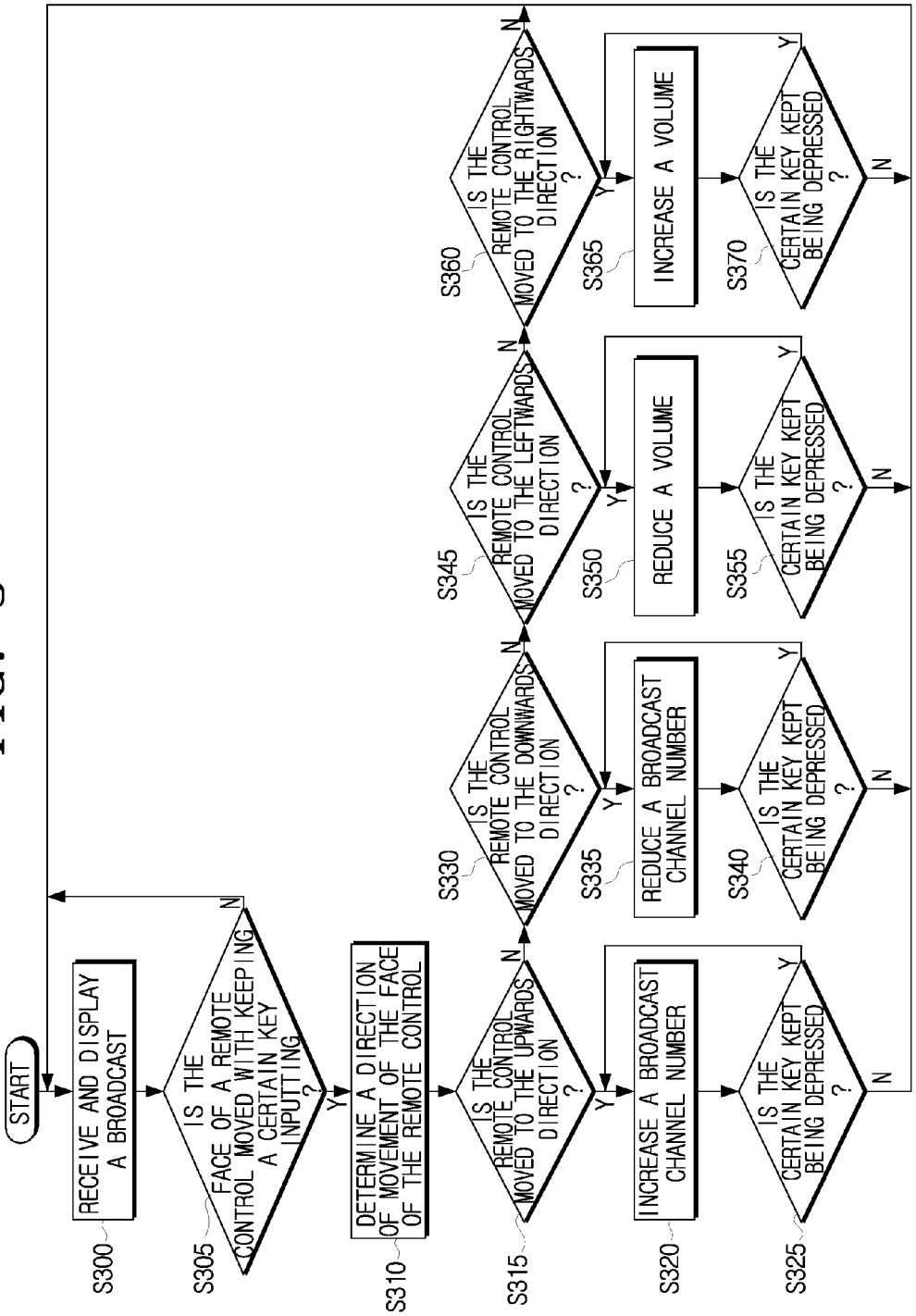
FIG. 3 is a flowchart illustrating a method for executing a command of a user according to a process of executing an operation selected by a spatial movement of a remote control, according to an exemplary embodiment of the present invention.

FIG. 3 is a flowchart illustrating a method for executing a command of a user according to a process of conducting an operation selected by a spatial movement of a remote control 200, according to an exemplary embodiment of the present invention.

Referring to FIG. 3, the DTV 100 receives a broadcast and displays the received broadcast on a display D (S300). In operation S300, the A/V processor 120 processes a signal to execute a broadcast outputted from the broadcast receiving unit 110, and the image output unit 140 and the audio output unit 150 respectively output a video and an audio outputted from the A/V processor 120.

If the face of the remote control 200 is moved, while keeping a certain key (for example, the select key) on the key input unit 240 of the remote control 200 inputting (S305-Y), the controller 160 determines a direction of movement of the face of the remote control 200 (S310).

If it is determined that the face of the remote control 200 is moved to the upwards direction based on the user (S315-Y), the controller 160 controls the broadcast receiving unit 110 to increase a broadcast channel number (S320).

If the user keeps depressing the certain key (S325-Y), the controller 160 repeats operation S320. An increase of the broadcast channel number is reiteratively executed.

On the other hand, if the user removes a finger from the certain key (S325-N), process is re-executed starting from operation S300.

Hereinbelow, referring to FIGS. 4A and 4B, operations S305 to S325 are explained in further detail. Four areas (U-area, D-area, L-area, and R-area) and the pointer P are displayed on a display D illustrated in FIG. 4A. In these figures i) the U-area is an area in which a function to increase a broadcast channel is assigned, ii) the D-area is an area in which a function to reduce the broadcast channel is assigned, iii) the L-area is an area in which a function to reduce a volume is assigned, and iv) the R-area is an area in which a function to increase the volume is assigned.

The four areas U-area, D-area, L-area, and R-area and the pointer P are illustrated on the display D for convenient description of an exemplary embodiment, but the four areas U-area, D-area, L-area, and R-area and the pointer P are not displayed on the display D while implementing the exemplary embodiment. That is, the four areas U-area, D-area, L-area, and R-area are virtual areas which do not exist on the display D, and also the pointer P is a virtual pointer P which does not exist on the display D.

Figure 4A:
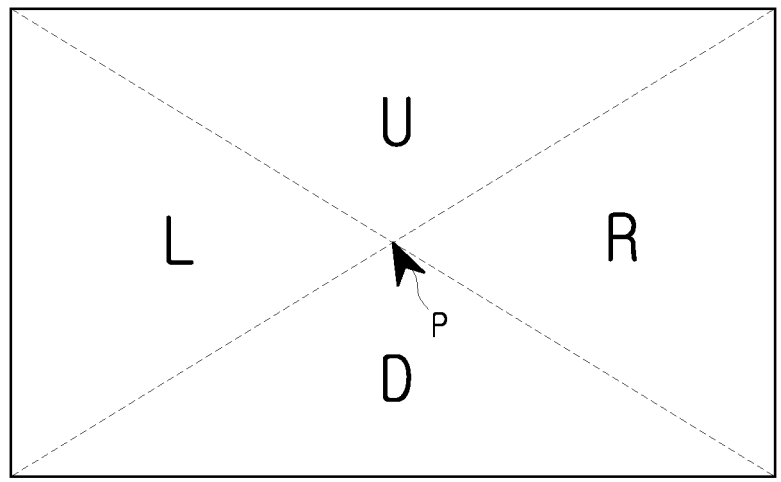
FIGS. 4A to 4C are views illustrating a method for executing a command of a user.

In operation 305, if a user inputs a certain key on the key input unit 240 of the remote control 200, the controller 160 positions the pointer P on the center of the display D, as illustrated in FIG. 4A.

Figure 4B:
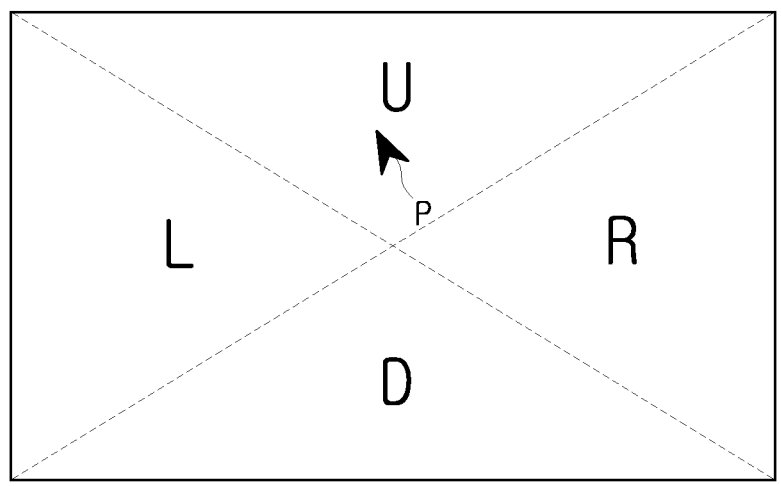

In operation S305, if the user moves the face of the remote control 200 to the upwards direction, with keeping a certain key being depressed, the controller 160 moves the pointer P in the U-area as illustrated in FIG. 4B. The controller 160 recognizes that the pointer P is positioned in the U-area, and the function assigned in the U-area which increases the broadcast channel number is executed.

The increase of the broadcast channel number remains while the user continues to depress the certain key. If the user removes a finger from the certain key, the controller 160 positions the pointer P on the center of the display D.

If it is determined that the face of the remote control 200 is moved downwards based on the user (S330-Y), the controller 160 controls the broadcast receiving unit 110 to reduce a broadcast channel number (S335).

If the user keeps depressing the certain key (S340-Y), the controller 160 repeats operation S335. A reduction of the broadcast channel number is reiteratively executed.

On the other hand, if the user removes a finger from the certain key (S340-N), process is re-executed starting from operation S300.

In operation S305, since the case in which the user moves the face of the remote control 200 downwards while keeping a certain key depressed is the case in which the pointer P is moved in the D-area (Referring to FIG. 4A), the controller 160 executes the function assigned in the U-area, which reduces the broadcast channel number.

Reduction of the broadcast channel number remains while the user continues to depress the certain key. If the user removes a finger from the certain key, the controller 160 positions the pointer P on the center of the display D.

If it is determined that the face of the remote control 200 is moved to the leftwards direction based on the user (S345-Y), the controller 160 controls the audio output unit 150 to reduce a volume (S350).

If the user keeps depressing the certain key (S355-Y), the controller 160 repeats operation S350. A reduction of the volume is reiteratively executed.

On the other hand, if the user removes a finger from the certain key (S355-N), operation is executed from operation S300.

In operation S305, since the case in which the user moves the face of the remote control 200 to the leftwards direction, while keeping a certain key depressed is the case in which the pointer P is moved in the L-area (Referring to FIG. 4A), the controller 160 executes the function assigned in the L-area, which reduces the volume.

Reduction of the volume remains while the user continues to depress the certain key. If the user removes a finger from the certain key, the controller 160 positions the pointer P on the center of the display D.

If it is determined that the face of the remote control 200 is moved to the rightwards direction based on the user (S360-Y), the controller 160 controls the audio output unit 150 to increase the volume (S365).

If the user keeps depressing the certain key (S370-Y), the controller 160 repeats operation S365. An increase of the volume is reiteratively executed.

On the other hand, if the user removes a finger from the certain key (S370-N), the process is re-executed starting from operation S300.

In operation S305, since the case in which the user moves the face of the remote control 200 to the rightwards direction while keeping a certain key depressed is the case in which the pointer P is moved in the R-area (Referring to FIG. 4A), the controller 160 executes the function assigned in the R-area, which increases the volume.

An increase of the volume remains while the user continues to depress the certain key. If the user removes a finger from the certain key, the controller 160 positions the pointer P on the center of the display D.

A method for determining the direction of spatial movement of the face of the remote control 200 and executing a user command by executing the specific function selected based on the determined direction of movement is described in detail below.

Figure 4C:
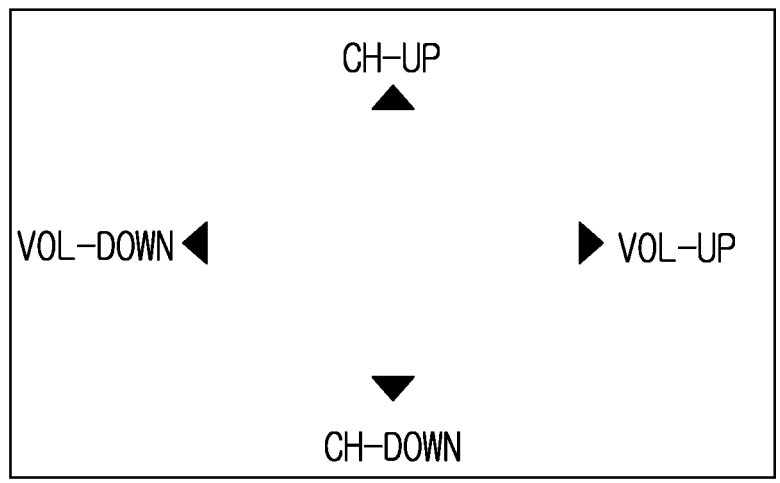

According to an exemplary embodiment of the present invention, an itemized guide may be displayed on the display D, offering visual indication of the functions which are designated in the respective areas of the display D. Referring to FIG. 4C, i) if a user causes the remote control 200 to be moved upwards, an item "▲"+"CH-UP" is displayed on an upper side of the display D (U-area in FIG. 4A), representing an increase of the broadcast channel number, ii) if the user causes the remote control 200 to be moved to the downwards direction, an item "▼"+"CH-DOWN" is displayed on a bottom side of the display D (D-area in FIG. 4A), representing a reduction of the broadcast channel number, iii) if the user causes the remote control 200 to be moved to the leftwards direction, an item "◀"+"VOL-DOWN" is displayed at the left side of the display D (L-area in FIG. 4A), representing a reduction of the volume, and iv) if the user causes the remote control 200 to be moved to the rightwards direction, an item "▶"+"VOL-UP" is displayed at the right side of the display D (R-area in FIG. 4A), representing an increase of the volume.

The controller 160 controls the operation of the GUI generator 130 to generate a GUI in which the respective items are displayed in the designated areas.

The areas on the display D may be defined by boundaries to more easily guide a user. Also, an item of the function which is being currently executed may be highlighted, or an area including the function which is being currently executed may be highlighted.

Although the functions that increase and decrease a broadcast channel number and the functions increase and decrease a volume are respectively assigned to the U-area, D-area, L-area, and R-area in the exemplary embodiment, this should not be construed as limiting. That is, the concept of the present invention is equally applicable to a case where other functions are assigned in the respective areas.

For example, a function to increase screen brightness may be implemented as an alternative function. The function to increase screen brightness may be assigned to the U-area, and the function to decrease screen brightness may be assigned to the D-area.

A function to select an item, such as an input source selection function, and a mode selection function may also be implemented as alternative functions. A TV input function may be assigned to the U-area, a high definition multimedia interface (HDMI) input function may be assigned to the D-area, a universal serial bus (USB) input function may be assigned to the L-area, and a Bluetooth input function may be assigned to the R-area.

Alternatively, a TV mode function may be assigned to the U-area, a photo reproducing mode function assigned to the D-area, a moving image reproducing mode function assigned to the L-area, and a music reproducing mode function assigned to the R-area. The photo reproducing mode function, the moving image reproducing mode function, and the music reproducing mode function may be provided respectively to reproduce a still image file, a moving image file, and a music file from a storage medium in the DTV 100.

Since the input source selection function and the mode selection function are not reiteratively operated, but are operated only once, the controller 160 may cause a corresponding operation to start as a user depresses a key, moves the face of the remote control 200, and release the key from the depressed state.

Unlike the input source selection function and the mode selection function, the channel change function and the volume change function may be reiteratively operated. That is, the input source selection function and the mode selection function are operated once, but the channel change function and the volume change function may be reiteratively operated several times.

In an exemplary embodiment, certain functions are reiteratively operated while a user keeps the corresponding keys depressed, but are interrupted if the user releases the keys from the depressed state. Accordingly, the convenience of a user is improved.

Although a function is reiteratively operated if a user keeps a certain key in a depressed state in this exemplary embodiment, the function may be reiteratively operated as the function selection state is maintained by an alternative manner.

For example, a function assigned to a specific area may be reiteratively operated if a user moves the face of the remote control 200 so that the pointer P is moved in the specific area, and then the user does not move the face of the remote control 200 any more so that the pointer P stays at the specific area. In this case, the reiterative operation of the function may be interrupted if the user moves the face of the remote control 200 to another direction, subsequently moving the pointer P to another area.

Figure 5A:
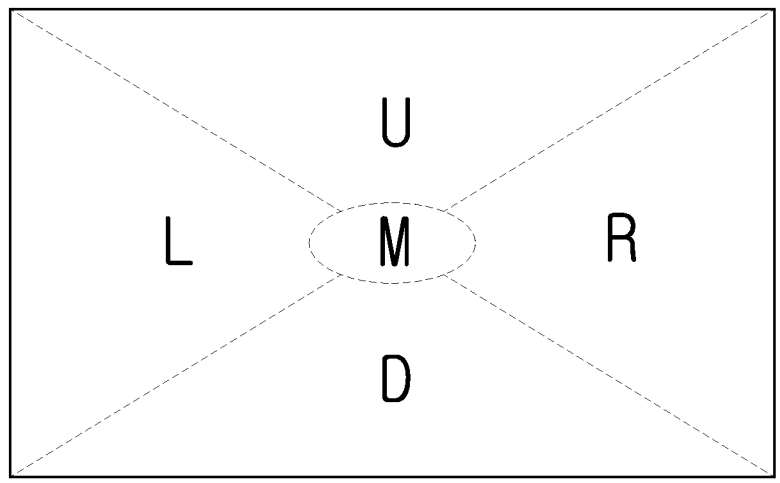
FIGS. 5A to 5D are views illustrating another exemplary embodiment of the present invention.

FIG. 5A is a view illustrating a method for executing a command of a user according to another exemplary embodiment of the present invention. FIG. 5A is different from FIG. 4A in that there is an M-area provided in addition to the U-area, the D-area, the L-area, and the M-area on the display D.

The M-area is different from the U-area, the D-area, the L-area, and the M-area in that no function is assigned to the M-area. Since the movement distance of the face of the remote control 200 is short, no function is executed as long as the pointer P positioned on the center of the display D is within the M-area.

The controller 160 determines the direction and distance of the movement of the face of the remote control 200 based on information about the movement of the face of the remote control 200 received through the receiver 170. If the determined distance exceeds a predetermined distance and the pointer P is moved out of the M-area by the movement of the face of the remote control 200, the controller 160 selects the function based on the determined direction of the movement, and executes the selected function. On the other hand, if the determined distance does not exceed the predetermined distance, that is if the pointer P remains within the M-area despite the movement of the face of the remote control 200, the controller 160 does not execute any function.

Accordingly, inadvertent executing of a function due to a slight movement of a user is prevented.

Referring to FIG. 5A, the functions are assigned on the four areas (the U-area, the D-area, the L-area, and the R-area) of the display D, but this is merely an exemplary embodiment for convenient description. The number of areas is not limited.

Figure 5B:
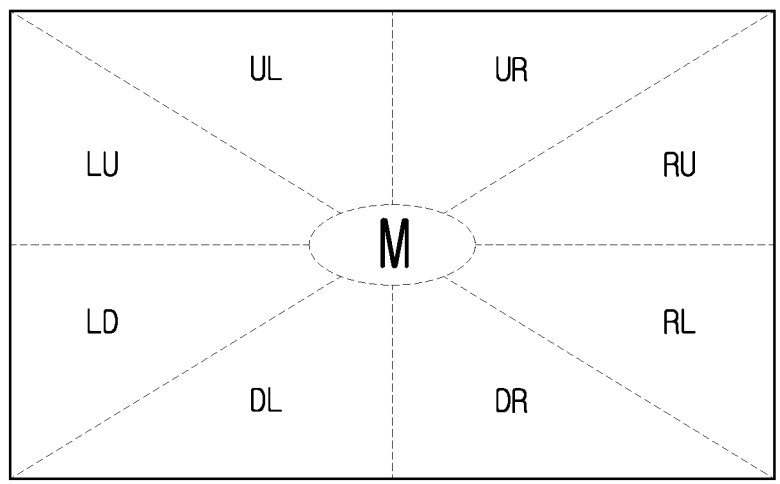
Figure 5C:
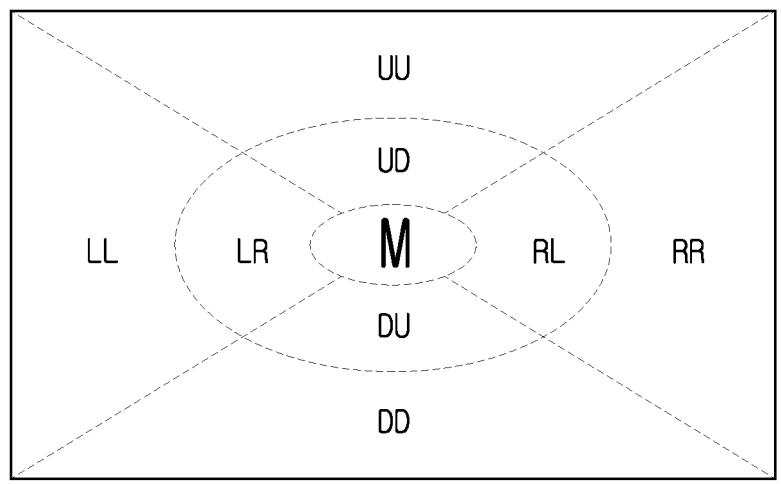

For example, functions may be assigned to eight areas (UL-area, UR-area, DL-area, DR-area, LU-area, LD-area, RU-area, and RD-area) of the display D, as illustrated in FIG. 5B. Additionally, functions may be assigned to eight areas (UU-area, UD-area, DU-area, DD-area, LL-area, LR-area, RL-area, and RR-area) of the display D, as illustrated in FIG. 5C. The M-area is an area to which a function is not assigned in FIGS. 5B and 5C.

Figure 5D:
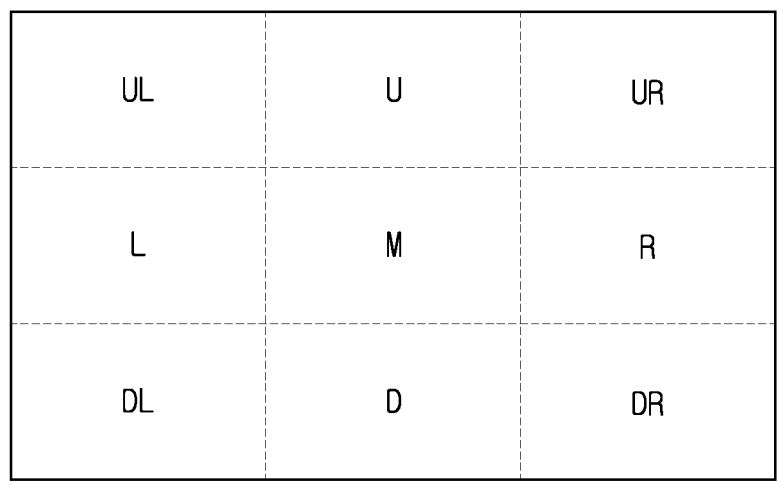

A method for arranging areas is not limited to a radial pattern as illustrated in FIGS. 5A to 5C. An alternative arrangement may be used. An example of the alternative arrangement of the function areas is illustrated in FIG. 5D.

If the areas are arranged as illustrated in FIGS. 5A to 5D, when a user selects a function, the controller 160 also considers the distance of movement of the face of the remote control 200, in addition to the direction of movement.

Although the exemplary embodiments have described the TV as an example of the broadcast receiving apparatus, the broadcast receiving apparatuses may be implemented as a set top box (STB), a digital multimedia broadcast (DMB) receiving apparatus, and a portable apparatus with a built-in module for receiving broadcast, such as a mobile phone with a built-in module for receiving DMB.

Hereinbelow, yet another exemplary embodiment of the present invention will be described in detail referring to FIGS. 6 and 7.

Figure 6:
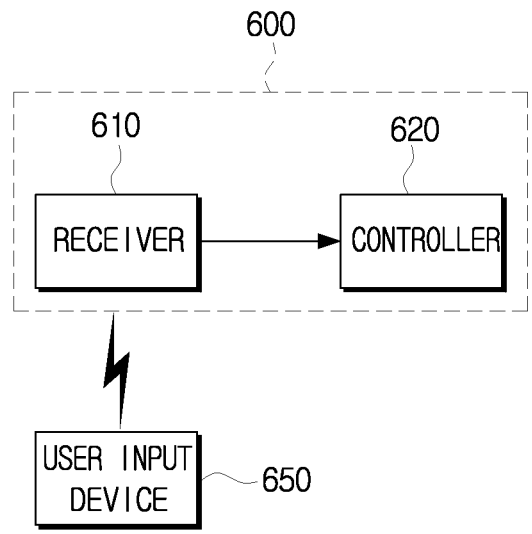
FIGS. 6 to 9 are views illustrating yet another exemplary embodiment of the present invention.

Referring to FIG. 6, an image apparatus 600 according to yet another exemplary embodiment of the present invention may include a receiver 610 and a controller 620. The image apparatus 600 may be connected with a user input device 650 to transmit and receive information.

The receiver 610 receives information on movement of the user input device 650 which is movable by a user, from the user input device 650.

The controller 620 determines the direction of movement of the user input device 650, selects one of a plurality of functions based on the determined direction of movement, and executes the selected function.

Figure 7:
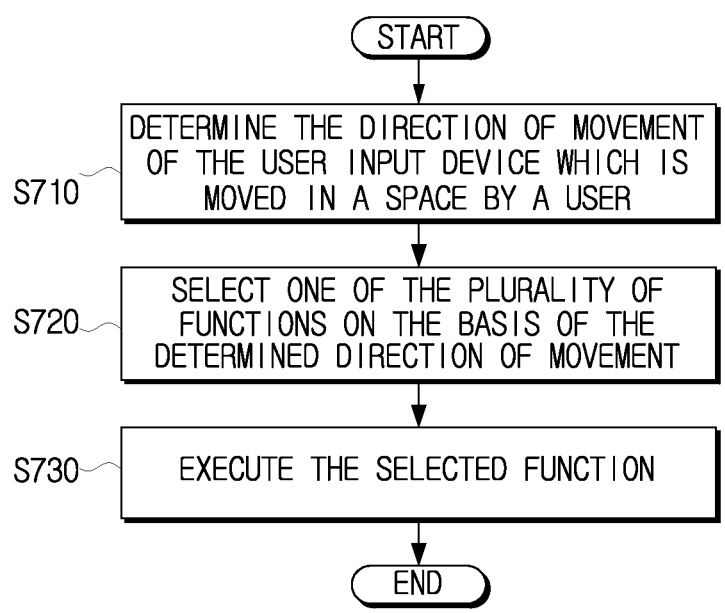

According to a method for executing a user command illustrated in FIG. 7, the controller 620 determines the direction of movement of the user input device 650 which is moved by a user (S710). The controller 620 selects one of the plurality of functions based on the determined direction of movement (S720). The controller 620 executes the selected function (S730).

Hereinbelow, yet another exemplary embodiment of the present invention will be described in detail with reference to FIGS. 8 and 9.

Figure 8:
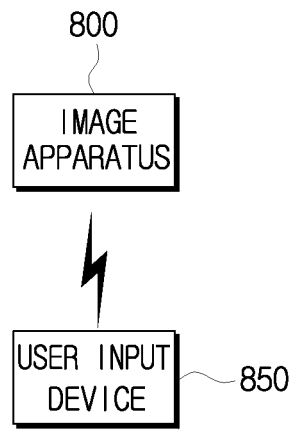

Referring to FIG. 8, an image system according to yet another exemplary embodiment of the present invention may include an image apparatus 800 and a user input device 850. The user input device 850 may be movable by a user.

The image apparatus 800 determines the position of the pointer P, which is moved according to the movement of the user input device 850 on the display D, selects one of a plurality of functions based on the determined position of the pointer P, and executes the selected function.

Figure 9:
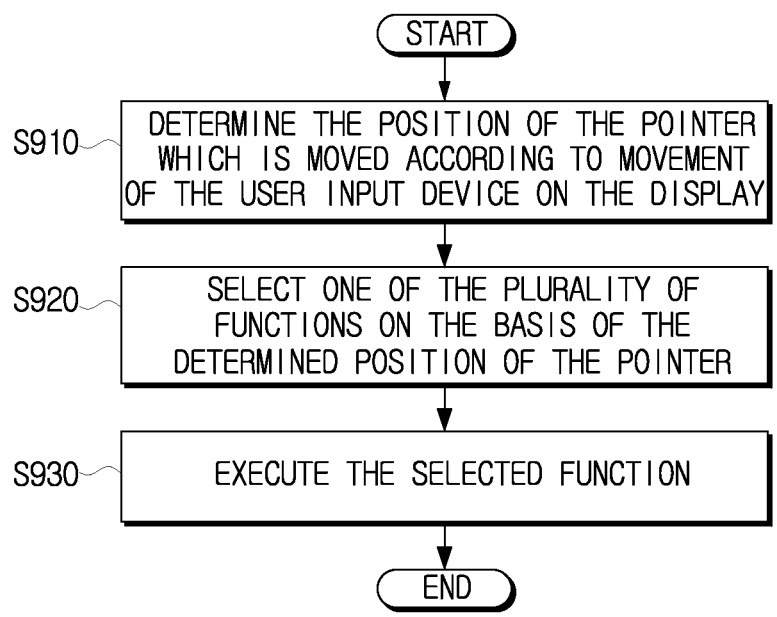

According to a method for executing a user command illustrated in FIG. 9, the image apparatus 800 determines the position of the pointer P, which is moved according to movement of the user input device 850 on the display D (S910). The image apparatus 800 selects one of the plurality of functions based on the determined position of the pointer P (S920). The image apparatus 800 executes the selected function (S930).

The user command may be executed by executing the function which is selected based on the direction of spatial movement by the user.

According to the exemplary embodiment of the present invention as described above, a user command which is determined based on the spatial movement of the user input device may be executed. Because a user command may be inputted by an alternative method without requiring a key manipulation, a more diverse and convenient way of inputting commands is provided. Also, a user input device may be miniaturized.

Further, the foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A broadcasting signal processing apparatus comprising:
a display;
a broadcasting signal receiver configured to receive a broadcasting signal;
a receiver configured to receive, from an input device wirelessly connected to the broadcasting signal processing apparatus, movement information that indicates spatial movement of the input device for controlling a pointing position on the display and selection information that indicates a user actuation of a hardware button of the input device; and
a controller configured:
 (a) to control the display to output an image based on the received broadcasting signal,
 (b) in response to continuous receipt of the selection information indicating user actuation of the hardware button of the input device while displaying the image:
  (i) to control the display to display a plurality of visual guide items on the image, the plurality of visual guide items representing a plurality of functions of the broadcasting signal processing apparatus for guiding a user how to control movement direction of the pointing position to select a function among the plurality of functions,
  (ii) to determine a movement direction of a pointing position based on the movement information while continuously receiving the selection information, and
  (iii) in response cessation of continuously receiving the selection information indicating user release of the hardware button of the input device, to select a function among the plurality of functions based on the movement direction of the pointing position indicated by the movement information.

2. The broadcasting signal processing apparatus of claim 1, wherein the controller is further configured to execute the function among the plurality of functions in response to determining that a distance of the movement of the pointing position is greater than a predetermined distance while the selection information indicating continuous user actuation of the hardware button of the input device is continuously received.

3. The broadcasting signal processing apparatus of claim 1, wherein the function comprises one of a broadcast channel change function, a volume change function, an input source selection function, a mode selection function, a screen brightness adjustment function, and an item selection function.

4. The broadcasting signal processing apparatus of claim 1, wherein the controller is further configured to control the display to discontinue displaying the plurality of visual items in response to the cessation of continuously receiving the selection information indicating user release of the hardware button of the input device.

5. The broadcasting signal processing apparatus of claim 1, wherein the plurality of visual guide items guide the user how to move the input device for selecting one among the plurality of functions.

* * * * *